(12) United States Patent
Haddad (10) Patent No.: US 7,707,297 B2
(45) Date of Patent: Apr. 27, 2010

(54) SYSTEM FOR CREATING A WIRELESS IP NETWORK CONNECTION AFTER PRE-ALLOCATING WIRELESS NETWORK BANDWIDTH AVAILABLE TO A COMPUTING DEVICE

(75) Inventor: Wassim Haddad, Verdun Municipality (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1773 days.

(21) Appl. No.: 10/697,951

(22) Filed: Oct. 31, 2003

(65) Prior Publication Data
US 2004/0215766 A1 Oct. 28, 2004

(30) Foreign Application Priority Data
Apr. 12, 2003 (GB) .................... 0308471.2

(51) Int. Cl.
*G06F 15/16* (2006.01)
(52) U.S. Cl. .................. 709/229; 709/227; 709/228; 709/226
(58) Field of Classification Search .................. 709/227, 709/228, 229, 224, 226; 370/331, 230, 474, 370/329, 252, 468; 455/67.13, 452.2
See application file for complete search history.

(56) References Cited

U.S. PATENT DOCUMENTS

| 7,480,239 | B1 * | 1/2009 | Sundaresan et al. | 370/230 |
| 2001/0012271 | A1 * | 8/2001 | Berger | 370/230 |
| 2003/0018784 | A1 * | 1/2003 | Lette et al. | 709/226 |
| 2003/0031208 | A1 * | 2/2003 | Anehem et al. | 370/474 |
| 2003/0117978 | A1 * | 6/2003 | Haddad | 370/331 |
| 2003/0212787 | A1 * | 11/2003 | Qiu et al. | 709/224 |
| 2004/0057400 | A1 * | 3/2004 | Walsh et al. | 370/329 |
| 2004/0085909 | A1 * | 5/2004 | Soliman | 370/252 |
| 2004/0170191 | A1 * | 9/2004 | Guo et al. | 370/468 |
| 2004/0196808 | A1 * | 10/2004 | Chaskar et al. | 370/331 |
| 2004/0198234 | A1 * | 10/2004 | Wacker et al. | 455/67.13 |
| 2004/0203831 | A1 * | 10/2004 | Khan | 455/452.2 |

FOREIGN PATENT DOCUMENTS

| WO | WO 00/13447 | 3/2000 |
| WO | WO 02/45305 A1 | 6/2002 |

* cited by examiner

*Primary Examiner*—Le Luu (57) ABSTRACT

A method of at least partially creating a network connection from a computing device to a network wherein the method comprises determining the bandwidth associated with the network connection that it is desired to make to the computing device from the network and assessing whether this bandwidth is available from the network before commencing creating the connection. Generally, this method will be used during a hand-over process from an existing network to the network.

37 Claims, 7 Drawing Sheets

SYSTEM FOR CREATING A WIRELESS IP NETWORK CONNECTION AFTER PRE-ALLOCATING WIRELESS NETWORK BANDWIDTH AVAILABLE TO A COMPUTING DEVICE

FIELD OF THE INVENTION

This invention relates to a system and related apparatus and methods for effecting at least one network connection.

MobileIP is a proposal that allows a mobile computing device to move between different wireless networks by creating network connections to a network to which the computing device wishes to enter. Although well known, it has yet to find wide applicability using the current Internet Protocol version 4. It will be appreciated that different formats of wireless network exist. For example, and naming only some of the protocols available, there are mobile telephone networks (GPRS and the proposed UMTS network), Wireless Local Area Networks (for example Bluetooth and WIFI (IEEE 802.11)).

A wireless network has a finite bandwidth for connections that can be made thereto. If this bandwidth is exceeded performance may drop off for devices that are connected to the network, network connections may be lost; in general network performance may be downgraded. In general therefore, it has been a problem with prior proposals that should too many connections be made, or attempted, then it is possible for the performance of the network to be adversely affected.

SUMMARY OF THE INVENTION

According to a first aspect of the invention there is provided a method of attempting the creation of a network connection from a computing device to a network wherein the method comprises causing a processing circuitry to determine the bandwidth associated with at least a portion of the network connection that it is desired to make to the computing device from the network and further causing the processing circuitry to assess whether this bandwidth is available from the network before commencing creating the connection.

An advantage of such an arrangement is that it may help to reduce failed connections between the computing device and the network.

Preferably, the method is used to hand-over a network connection from an existing network to the network and as such is advantageous because it may help to reduce the number of network connections that are lost. Previously, it has simply been attempted to hand-over the network connection from the existing network to the network and if this hand-over failed, the network connection to the computing device would be lost. Although primarily aimed at wireless networks, this invention may find wider applicability.

Alternatively, or additionally, the method may be applied to further network connections to a network from a computing device that already has connections to the network. These further network connections may comprise one or more channels as discussed hereinafter.

Said network connection between the computing device and the existing and/or the network may comprise one or more channels. Generally, each channel will be assigned to a specified IP port of the computing device. Generally, any one piece of application software running on the computing device may be assigned a channel of the network connection. Some software applications may be assigned a plurality of channels. Of course, it will be appreciated that increasing the number of channels available for software can be used as a mechanism to increase the bandwidth for that software.

The method may comprise causing the processing circuitry to determine the bandwidth required by each of the channels within the network connection. Such a method is advantageous because it may allow a network hand-over to be completed for some, but not all of the channels. Indeed, the method may allow some channels to be maintained with the existing network, whilst other channels are handed over to the network, or channels may be dropped if they are not handed over to the network.

Alternatively, or additionally, the method may comprise determining the total bandwidth of the network connection and the network.

The method may be arranged to hand-over a connection from an existing network to a network running the same, or substantially the same, protocol. Such a method is applicable for networks that comprise a plurality of cells (as well as networks that do not), and the method may manage the hand-over of a connection between a first cell and a second cell (i.e. the first cell may comprise the existing network and the second cell may comprise the network). The method may, for example, be arranged to hand-over a connection between a first cell of a WIFI network, to a neighbouring, second, cell of the WIFI network. The second cell would generally operate on a different channel of the available WIFI frequency bands to the first cell to avoid interference.

Alternatively, the method may be arranged to hand-over a connection from an existing network to a network operating on a different protocol. For example, the method may be arranged to hand-over an existing connection from a cellular telephone network (for example GPRS, UMTS, or the like) to a connection to a wireless LAN (for example IEEE 802.11, Bluetooth, or the like). Such an arrangement is convenient because, as the skilled person will appreciate, different network protocols have different advantages. Cellular phone networks have a wide coverage, but are expensive and offer lower bandwidth when compared to wireless LAN's. Wireless LAN's may be looked on as having a higher bandwidth than other protocols, but generally have a lower coverage.

The processing means used to determine the bandwidth of at least a portion of the network connection and/or to assess whether this bandwidth is available from the network may be provided by the computing device or the network.

According to a second aspect of the invention there is provided a processing unit arranged to provide a wireless network capable of making one or more data connections to at least one computing device, said processing unit comprising a receiving means, arranged to receive data specifying the bandwidth requirements for a network connection between the network and a computing device that wishes to join the network, a processing means, arranged to process data received from said receiving means and if bandwidth is available to cause an allocation means to allocate a bandwidth to at least one of the connections.

Such a processing unit is advantageous because it can help to reduce lost connections as computing devices join the network in that the computing device may be assigned the bandwidth it requires before the data connection is created between the network and the computing device.

The receiving means may be a port/interface of the processing unit that connects to the wireless network, and as such, data may be received from the wireless network.

Generally, the processing unit is a server arranged to provide the wireless network.

According to a third aspect of the invention there is provided a computing device capable of connecting to at least one wireless network, said computing device comprising a detection means arranged to detect the existence of wireless networks to which it is capable of connecting, a bandwidth measuring means, arranged to determine the bandwidth of one or more connections that it is desired to make with a network, and transmission means arranged to transmit the bandwidth determined by the bandwidth measuring means to a network detected by the network detection means to which it is possible to make a connection said computing device further comprising a transceiver arranged to establish a connection with said network should sufficient bandwidth be available.

The computing device may be a PC (particularly those referred to as notebooks), an iBook, PDA, telephone, or any other, generally portable, computing device. The computing device may be arranged to make a connection to a wireless network only after it has negotiated with the network the bandwidth that it requires.

According to a fourth aspect of the invention there is provided a computer network comprising a processing unit providing a wireless network comprising at least one data connection to a computing device, said processing unit comprising a receiving means, arranged to receive data from said computing device, said network further comprising a bandwidth assessing means arranged to determine the bandwidth requirements for further network connections that it is desired to make to the network from one of said computing device and another computing device wishing to join the network, the processing means further comprising a processing means arranged to process data received from said receiving means and cause an allocation means to allocate a bandwidth to at least one of the connections.

The bandwidth assessing means may be provided on the processing unit of the network. However, the bandwidth assessing means is likely to be placed on the computing device since it is unlikely that the processing unit will be able to determine the bandwidth until a network connection has been established.

According to a fifth aspect of the invention there is provided a data carrying medium containing instructions, which when loaded on to a computer system, cause that computer system to perform a method according to the first aspect of the invention.

According to a sixth aspect of the invention there is provided a data carrying medium containing instructions, which when loaded on to server, cause that server to perform as a server according to the second aspect of the invention.

According to a seventh aspect of the invention there is provided a data carrying medium containing instructions, which when loaded on to a computing device, cause that computing device to perform according to the computing device according to the third aspect of the invention.

According to a eighth aspect of the invention there is provided a data carrying medium containing instructions, which when loaded on to a network, cause that network to perform according as the network according to the fourth aspect of the invention.

It will be appreciated that the computer readable medium of any of the fifth, sixth, seventh and eighth aspects of the invention may comprise any of the following: a floppy disk, a CDROM, a DVD ROM/RAM (including +RW, −RW), any form of magneto optical storage, a hard drive, a transmitted signal (including an Internet download, file transfer, or the like), a wire, or any other vehicle for conveying computer data.

Embodiments of the present invention are now described by way of example only and with reference to the accompanying drawings, of which:

DETAILED DESCRIPTION OF THE INVENTION

Computing devices such as PC's (especially those referred to as laptops), iBooks, mobile phones and Personal Digital Assistants (PDA's) which access wireless networks are increasingly common. The present invention is described in relation to two common 'hand-over' procedures that a connection between a mobile device and a network may undergo. A successful hand-over may be thought of as one that does not affect the on-going use of data transfer to and from the device.

Figure 1:
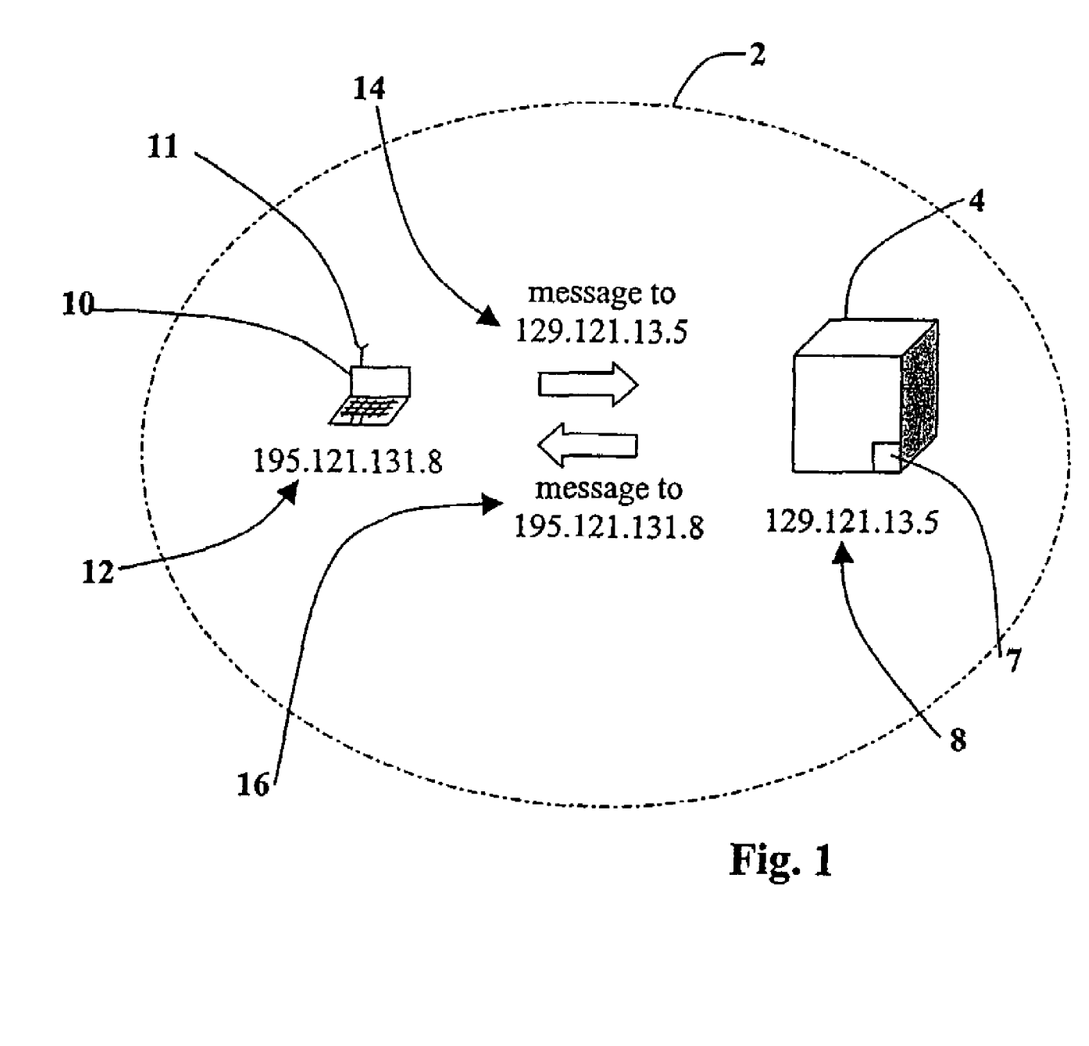
FIG. 1 shows an example of a wireless network.

An example of a wireless network 2 is shown in FIG. 1 and comprises a processing unit which may be termed a server 4. The server 4 has a network address 8 and comprises a WIFI hub 7 to generate the network 2. In this example the network generated by the server 4 is a WIFI network and may provide a cell operating on one of the three available WIFI channels, but of course any other suitable wireless protocol may be used. The server 4 has a network address 8, which in this example is 129.121.13.5 which follows the well known TCP/IP protocol as will be well understood by the skilled person. In communication with the server 4, via the wireless network 2, is a mobile computing device 10, which in this case is a laptop PC. The computing device also has a network address 12, again following the well-known TCP/IP format. Again, it will be appreciated by the skilled person that other network addresses formats may be possible and that the TCP/IP format is provided merely be way of example. Data packets 14 sent from the computing device to the server 4 contain the network address 8 of the server, and likewise data packets 16 for the computing device 10 contain the network address 12 of the computing device 10.

The computing device 10 is provided with a WIFI access card having an aerial 11 and which provides a receiver or receiving means, a transmitter or transmitting means. The card may also be though of as a transceiver.

Figure 2:
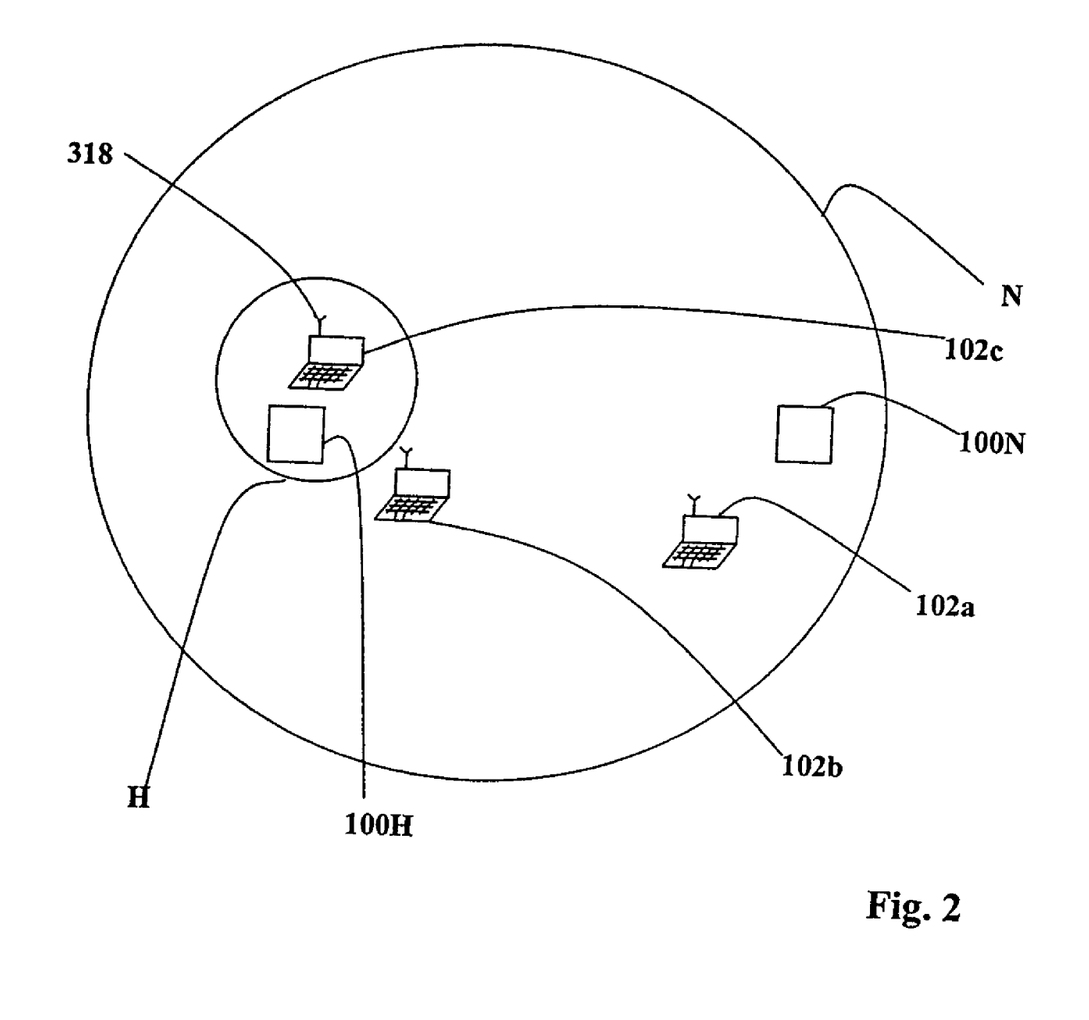
FIG. 2 shows a schematic representation of a wireless network comprising a 'hotspot'.

It is of course possible for an area to be covered by two or more wireless networks. For example, a building may be provided with a WIFI network, but within the building there may exist short range BLUETOOTH connections, and the building and its surrounding area may be covered by a mobile telephone network (for example a GPRS, or UMTS network). Other scenarios are equally possible. An example of such an arrangement is shown in FIG. 2, which comprises a GPRS (general packet radio service) wireless cellular network N and an IEEE 802.11 network H.

Figure 7:
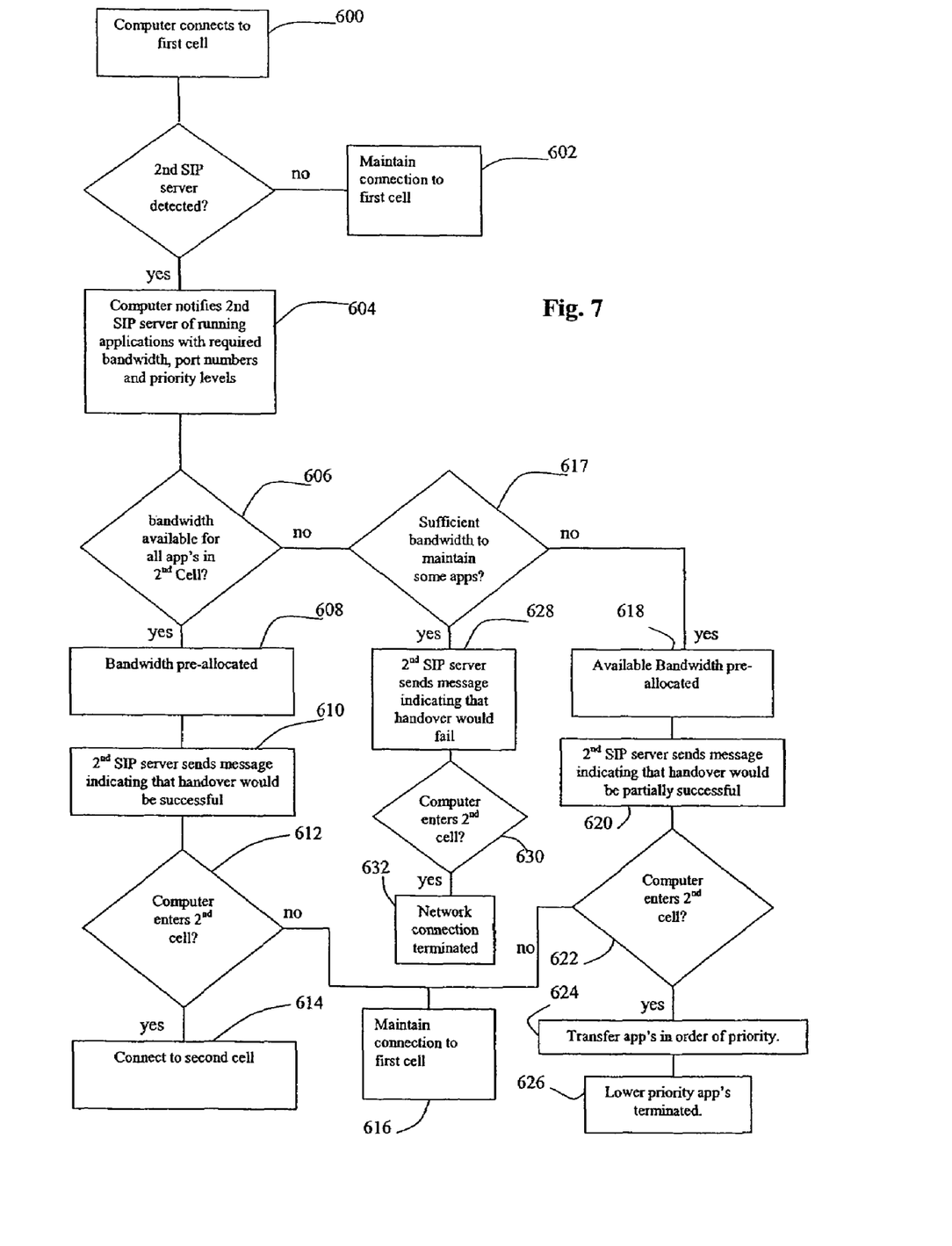
FIG. 7 shows a flowchart outlining the processes of the second embodiment of the present invention.
Figure 8:
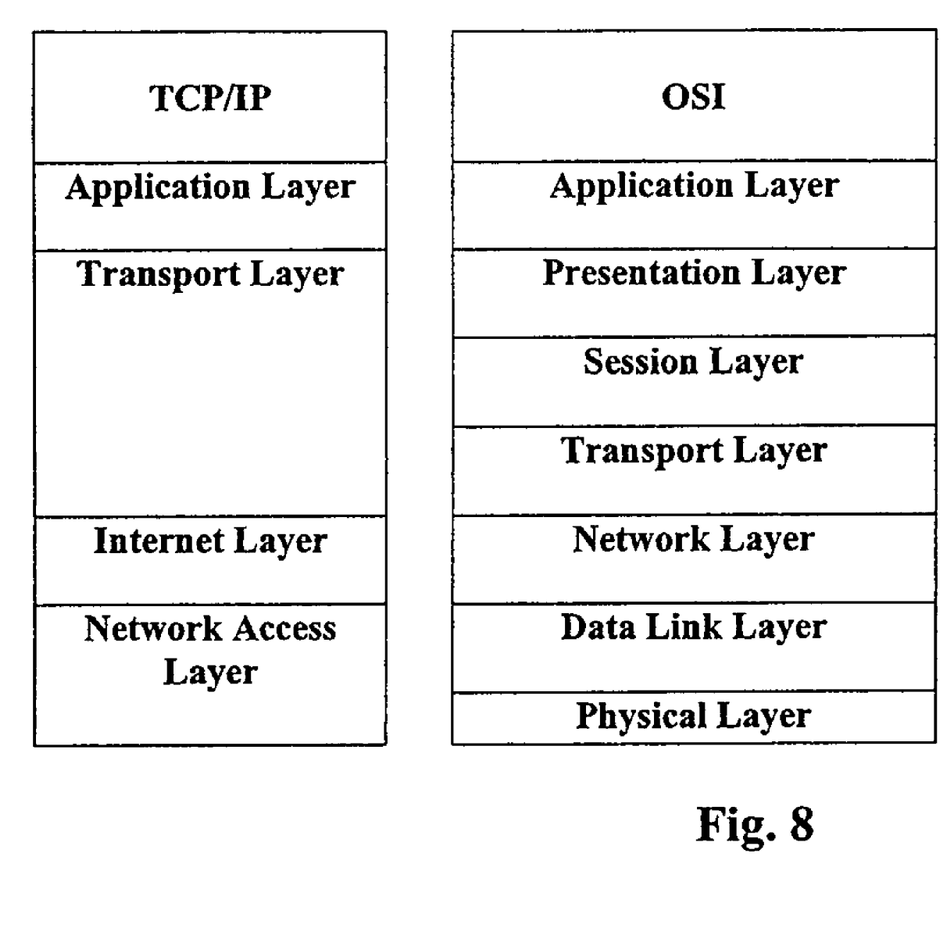
FIG. 8 shows the seven-layer OSI model.

If an area is covered by two networks, each of which is operating the same protocol (i.e. technology), a so-called horizontal hand-over occurs when a network connection is moved between the two networks. An example of such a hand-over would be moving between cells in a cellular network. A horizontal hand-over occurs at the datalink layer of the Open Systems Interconnect (OSI) reference model, which provides an interface with the network adapter and maintains logical links for the subnet. More specifically, the hand-over occurs at the medium access control sub layer. For ease of reference, the OSI reference model is shown in FIG. 7. In such a horizontal hand-over, a computing device 10 maintains its own IP address 12.

If the networks utilise differing protocols (i.e. technologies), a so-called 'intertech example of macromobility', a vertical hand-over occurs. In this case, the hand-over occurs at the network layer of the OSI reference model (which handles the logical addressing and routing of data from a computing device), typically via the Internet protocol. The computing device 10 is given a new IP address 12.

As discussed above a first embodiment of the present invention relates to a 'hotspot' provided by an IEEE 802.11 network h within a wireless GPRS network N. The user of a mobile communication device, computing device or computing means, such as a laptop computer or a WAP (Wireless Application Protocol) telephone may generally connect to the cellular network N. It will be appreciated that the demand for network connections within an office building will usually be more concentrated than outside and that the bandwidth requirement from any data connection to the network may well be higher. Therefore, when inside an office building, it is preferable to provide an alternative wireless network, for example W-LAN (IEEE 802.11) network, a Bluetooth network, etc. that may be geographically more limited than the GPRS network N, but cheaper and faster and capable of accepting a greater load than a cellular network It will be appreciated that any one computing device may have a plurality of software applications running thereon. For example, an Internet browser may be open, an email program may be sending/receiving emails from a mail server, it is conceivable that video, or audio, may be being streamed. These as well as other applications may all be running concurrently. It will therefore be appreciated that any one network connection between a computing device and the wireless network may in fact comprise a number of channels. Each application communicating across the wireless network uses at least one channel, and some applications (generally those with a higher bandwidth requirement such as video streaming) may use a plurality of channels within the network. Each channel within the network connection is generally assigned a port of the IP address 12.

When moving into the area covered by the hotspot network H, ideally the data connection and all of its channels should be transferred onto the hotspot network H from the GPRS network N. As described below, this may not always be possible since the hotspot network H may not have the available bandwidth to achieve this.

It may be possible to prioritise various channels within any one network connection. Such prioritisation may occur either by user input on their own computing device or according to predetermined rules set by the system/computing device. Some applications may be considered essential (i.e. without these particular applications, the network connection may as well be terminated). The remaining applications may be ranked according to their usefulness. As an example, it is likely that a channel assigned to a video connection will be given a high priority due to its real time nature: if packets are dropped, or interfered with, the quality of the video will be affected. Further, it is likely that a channel assigned to an email program will be assigned a low priority: it does not generally matter if the exchange of emails is interrupted since this may be resumed at a later time.

As can be seen in FIG. 2 the IEEE802.11 hotspot network H comprises a server 100H and the GPRS network comprises a server 100N. These servers 100H,N and that shown in FIG. 1 may have the construction shown schematically in FIG. 3 and described below although others are equally possible. Also shown in FIG. 2 are a first 102a, a second 102b and a third 102c computing device. These generally share the construction of computing device 102 shown schematically in FIG. 4 and described below.

Figure 3:
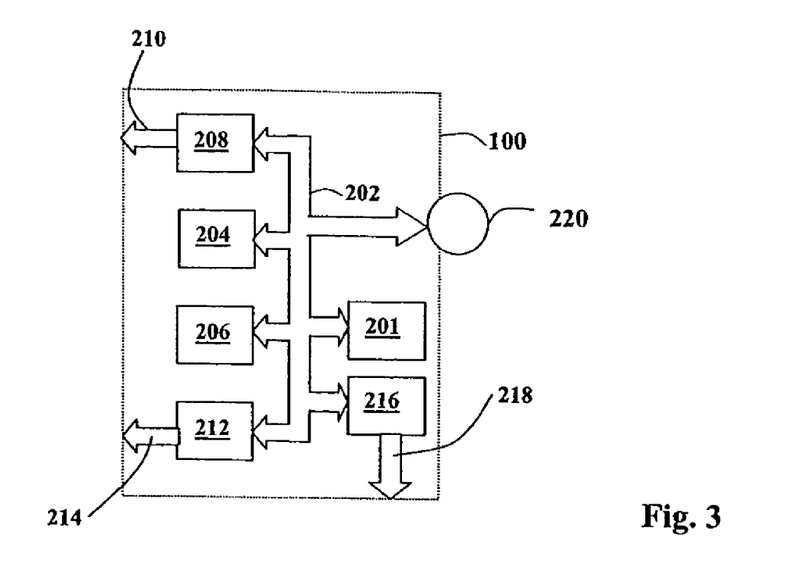
FIG. 3 shows a schematic representation of a server that may be utilised to provide the present invention.

The servers 100H,N and 4 may comprises a processing means 201 (which will generally be 2 or more processors such as the Intel Pentium 4 processor running at 2 GHz or more) connected via a bus 202, to a memory 204 and a hard drive array 206. The hard drive array 206 will generally comprise a RAID (Redundant Array of Inexpensive Disks) in order to increase data security. The bus 202 also connects the processor to a display driver 208, which can drive a monitor connected to an output interface 210. An input/output controller 212 also connects to the bus 202 and allows a keyboard, mouse, etc. to be connected to the processor 201 via ports 214 which would typically be Universal Serial Bus (USB) ports. A network controller 216 is provided to connect the processing means 201 to a network via an output port 218. The processor 201 is further connected to an IP port 220, which provides access to the Internet. The server 100, together with network adapters, provides the necessary processing circuitry to operate a network. Of course, although example hardware has been described for the architecture of the server 4,100 it will be readily appreciated that other hardware/architectures will be equally possible. Generally, the server will run an operating system such as Windows NT provided by the Microsoft Corporation, LINUX, HP UNIX, or the like.

The processing means of the server may provide the bandwidth assessing means, and bandwidth assessing means of a network arranged to assess the bandwidth of a new or existing connection or channel and allocate sufficient bandwidth for a new connection or channel respectively. Thus the processing means may also be thought of as allocator or allocating means for allocating bandwidth.

Figure 4:
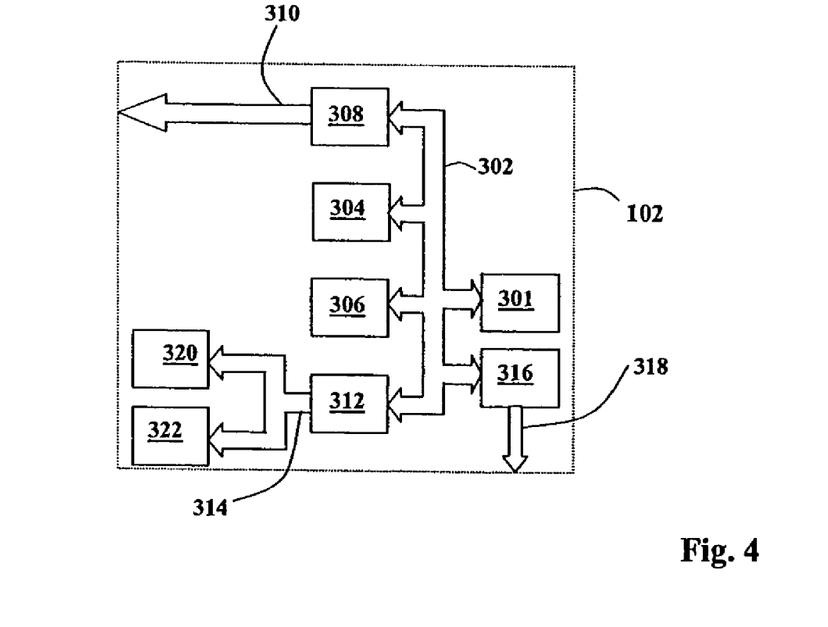
FIG. 4 shows a schematic representation of a computing device.

FIG. 4 shows an example of the architecture of a computing device 102 that could be connected to a network. In the example shown, the computing device 102 is a portable PC running the LINUX operating system. However, in other embodiments the computing device 102 may be any other form of computing device, and may be a portable PC running Microsoft™ Windows™ 2000, Windows XP™, Apple™ iBooks™, PDA's, telephones, or any other form of computing device.

The structure of the computing device 102 is similar to that of the server. A processing means 301 (in this case generally a single processor such as an mobile Intel Pentium 4 running at 2 GHz or above) is connected, via a bus 302, to a memory 304, and a hard drive 306. The bus 302 also connects the processor to a display driver 308, which can drive an LCD display driven by an output interface 310. An input/output controller 312, is also connected to the bus 302 and drives a keyboard 320 and a trackpad 322 via a connection 314 and allow a user to make inputs thereto.

A network card, in this case wireless network PCMIA card 316, is provided to allow the processor 301 to make a connection to a network via an aerial 318 which in this case is external to the computing device 102 but would generally be included within the casing thereof. The network card provides a transceiver that allows the computing device 102 to communicate with a network. It will be appreciated that a network card is provided for each different technology network, network protocol, to which it is desired to connect. For example, if the computing device is to connect to a WIFI or IEEE 802.11 network then it must have a network card capable of communicating with this technology. Similarly, for the computing device to connect to a cellular, or GPRS network, then it must have a network card capable of such communication.

The network card 316 also provides a detector allowing the computing device 102 to detect a wireless network to which a connection can be made.

The processing means 316 runs code that allows it to determine the likely bandwidth of a connection that it is desired to make to the wireless network. As such the processing means 316 provides a bandwidth measurer or a bandwidth measuring means. For example if an application running on the computing device 102 requests a network connection then the processing means 316 is arranged to determine the bandwidth that the requesting application would require. In embodiments in which a hand-over process is being performed between two networks then the processing means 316 may measure the bandwidth of a network connection before it is handed over between the networks.

In the example of FIG. 2, the first computing device 102a is inside the cellular network N but outside the hotspot network H (the hotspot network providing a network). It is therefore connected to the cellular network N (the cellular network providing an existing network). The second computing device 102b is also within the cellular network N but outside the hotspot network H, although it is close to the boundary of the hotspot network H. It is connected to the cellular network N but, as discussed below, is engaged in negotiations with the server 100 inside the hotspot network H. The third computing device 102c is within the hotspot network H and the cellular network N. It may be connected to the hotspot network H, the cellular network N or may have applications running on both networks. It will be appreciated that the computing device 102c can communicate with both the cellular network N and the hotspot network H since the areas covered by the networks overlap.

The first embodiment of the present invention is described in relation to a transfer between networks when a single computing device 102 is moved from the position occupied by the first computing device 102a (i.e. remote from the hotspot network H), through the position occupied by the second computing device 102b (i.e. at the boundary of the hotspot network H), to the position of the third computing device 102c (i.e. within the hotspot network H)

Both the computing device 102 and the server 100 inside the hotspot network H run a SIP (Session Initiation Protocol) application. Under SIP, and according to prior art practices, a mobile computing device is assigned an address, known as a SIP address, when it connects to a SIP server as part of the hand-over procedure. This enables the computing device 102 to be identified within the network. The SIP address is assigned at the application layer, the highest layer of the OSI model (the skilled person will be familiar with the OSI model). SIP is provided to facilitate MobileIP, i.e. dropping and initiating connections when moving between networks without terminating applications. It has long been a limitation of MobileIP that if a computing device 102 moves into an area covered by a network that can not, for some reason (such as limited bandwidth) provide sufficient bandwidth for a connection to the computing device then a network connection between the computing device and the network to which it is moving cannot be established. Therefore, any channels of a network connection that exist between the computing device and another network cannot be transferred to the network and if a transfer is attempted it is likely that one or more channels may be lost.

The server 100 periodically transmits a SIP signal to advertise its presence. The SIP application running on the processor 301 of the computing device 102 is arranged to acknowledge these signals if the computing device 102 proposes to connect to the hotspot network. In the present embodiment, this acknowledgement is enhanced which may provide for a more frequently successful transfer process.

The computing device 102 will perform the following processes depending on its location. The processes are summarised in the flowchart of FIG. 5.

Figure 5:
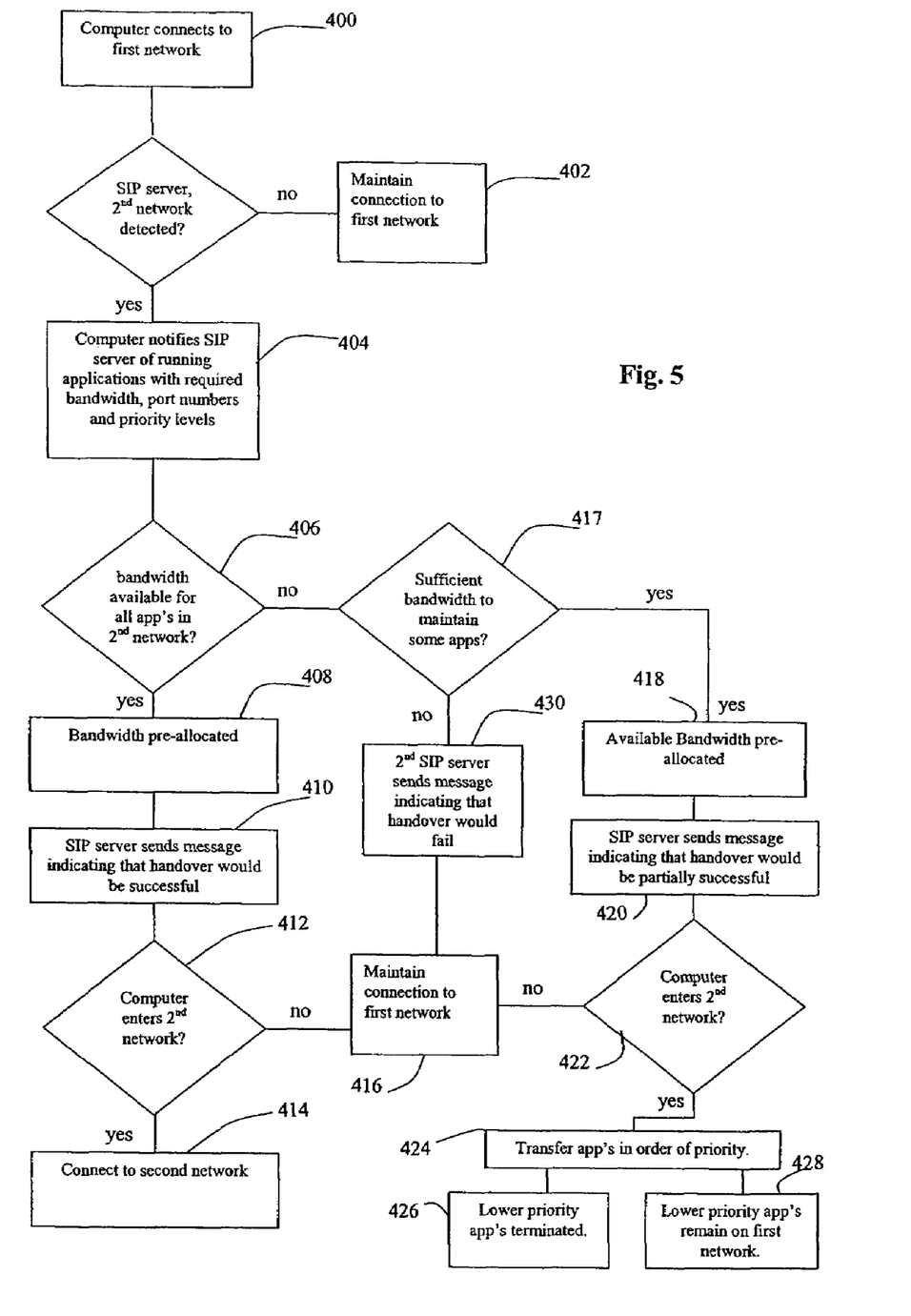
FIG. 5 shows a flowchart outlining the processes of the first embodiment of the present invention.

The computing device 102 approaches the vicinity of the hotspot network H whilst possibly connected to the cellular network N (step 400). It will be appreciated that the computing device may not have any network connections that exist. The server 100 periodically emits a SIP signal, which may be thought of as an invitation to close-by computing devices to connect to the network it advertises. When the computing device 102 is in the position of computing device 102a, it does not receive the invitation, or does not receive the invitation with sufficient strength to warrant acknowledgement, as it is too distant from the server 100. The computing device 102 therefore maintains any existing network connection to the cellular network N (step 402). However, when the computing device 102 is in the position of computing device 102b, it does receive the invitation and enters into a 'handshake' process (step 404) which occurs using the appropriate network card of the computing device. For example if the hotspot network H is an IEEE 802.11 network then the handshake occurs using IEEE 802.11.

In other embodiments, it would of course be possible to perform the handshake with a network protocol other than that of the network to which it is desired to connect. For example, the handshake may be performed by communicating with the server 100 via the cellular network N to negotiate connection to the hotspot network H.

This handshake process comprises the SIP application running on the processor 301 of the computing device 102 sending a signal comprising acknowledgement of the invitation and details of the applications it is running over the cellular network. These details may include any of the following: the bandwidth required to provide one or more channels associated with each application, the port number of the application and the priority level of the application (i.e. how important it is that the application should not be terminated). In this embodiment, all of this information is transmitted to the server 100. The signal is a request for bandwidth, which, if available could be pre-allocated to the computing device 102 before it attempts to commence a hand-over, or connection to the hotspot network H. The server 100 of the hotspot network H receives this signal and compares the bandwidth requirements of each application with the bandwidth available (step 406).

It may be that the hotspot network H can well provide a network connection for the computing device 102, in which case the bandwidth required is pre-allocated (step 408). The server 100 then sends a message to the effect that, if the computing device 102 was to enter the hotspot network H, then the application hand-over to the hotspot network H should be successful (step 410). If the computing device 102 then enters the hotspot network H (step 412), the network connection (including any channels therein) is transferred to the hotspot network H (step 414). Otherwise, if the computing device 102 does not enter the hotspot network H, the computing device 102 remains connected to the cellular network N (step 416).

Such transfer is intended to include the use of a 'care of address' as utilised in MobileIP, or the assignment of an address within the network. It will be appreciated that even if a care of address is used the network will still have to have sufficient bandwidth to support the new network connection to the computing device 102.

It may be that the hotspot network H can only accommodate some of the channels associated with applications running on the computing device 102 in which case the bandwidth required for each channel is considered (step 417). It is determined which of the channels (generally starting with the highest priority channel) can be accommodated on the hotspot network H. The bandwidth for these channels is pre-allocated by the server 100. The server 100 then sends a message to the effect that, if the computing device 102 was to enter the hotspot network H, then the network connection hand-over to the hotspot network H would be partially successful (step 420). If the computing device 102 then enters the hotspot network 102 (step 422), the channels within the network connection, identified by (in this embodiment) their port numbers, can be transferred to the hotspot network H in order of priority (step 424). The remaining, low priority, applications can either be terminated (step 426) or remain connected to the cellular network N (step 428). Otherwise, if the computing device 102 does not enter the hotspot network H, the computing device 102 remains connected to the cellular network N (step 416).

If the hotspot network H can accommodate none of the network applications running on the computing device 102, or can not accommodate all the essential applications, the server 100 sends a message to the effect that, if the computing device 102 was to enter the hotspot network H, then the application hand-over to the hotspot network H would be unsuccessful (step 430). The computing device 102 then remains connected to the cellular network N (step 416), even if the computing device 102 is physically within the area covered by the hotspot network H.

As an additional step, connection to the hotspot network H may only proceed if the user of the computing device 102 indicated in response to the message from the server 100 that the available resources are sufficient to initiate a complete or partial hand-over. Alternatively, the resources may have to meet predetermined system standards before a hand-over, or partial hand-over, is initiated.

Figure 6:
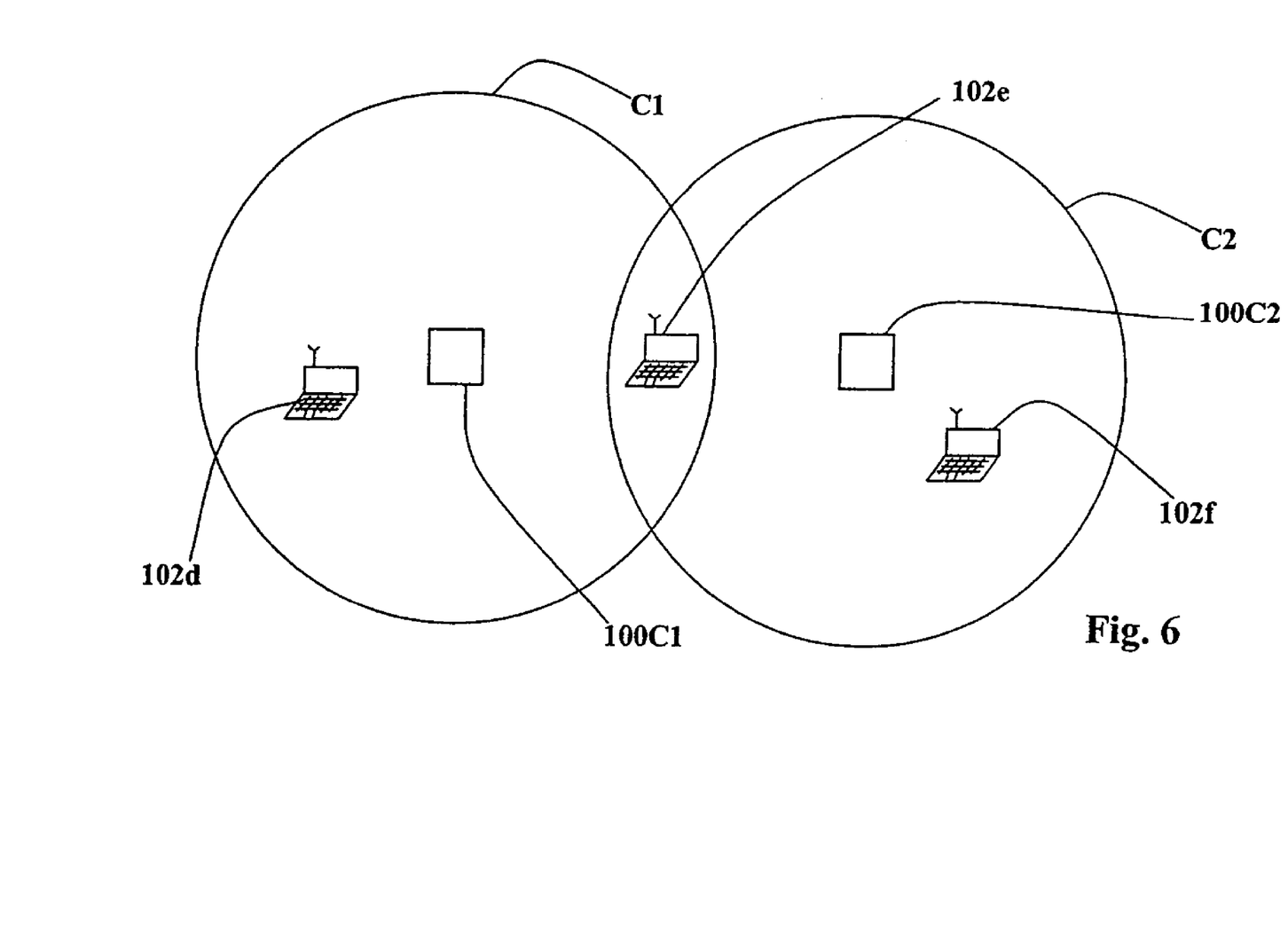
FIG. 6 shows schematic representation of two cells of a wireless network.

As a second embodiment of the present invention, consider a cellular network as shown schematically in FIG. 6 comprising a first C1, and a second C2 cell, the first cell C1 containing a first server 100C1, and the second cell containing a second server 100C2. Also shown are a first 102d, a second 102e and a third 102f computing device.

The first computing device 102d is inside the first cell C1 and is connected to the first server 100C1. The second computing device 102e is within the overlap between the first cell C1 and the second cell C2. Generally, the first and second cells operate on a different frequency band if they are using the same network protocol so that interference does not occur between the cells. IEEE 802.11 generally has three channels for such purposes. The second computing device 102e is connected to the first server 100C1 but, as discussed below, is engaged in negotiations with the second server 100C2. The third computing device 102f is within the second cell C2. It is connected to the second server 100C2. The computing devices 102d, 102e, 102f share the construction of the computing device 102 shown in FIG. 4. Both the first server 100C1 and the second server 100C2 run a SIP (Session Initiation Protocol) application. The servers 100C1, 100C2 share the construction of the server 100 shown in FIG. 3.

The second embodiment of the present invention is described in relation to a move between the cells C1, C2 of a cellular network. The computing device 102, for the purpose of this example, travels from the position occupied by the first computing device 102d (i.e. within the first cell C1) through the position occupied by the second computing device 102e (i.e. within the overlap between the first cell C1 and the second cell C2) then to the position occupied by the third computing device 102f (i.e. within the second cell C2).

The computing device 102 will perform the following processes depending on its location. The processes are summarised in the flowchart of FIG. 7.

The servers 100C1, 100C2 periodically emit a SIP signal, which may be thought of as an invitation to close-by computing devices to connect to the network cell it advertises.

The computing device connects to the server 100C1 of the first cell C1 (step 600) when the computing device 102 is in the position of the first computing device 102d. It is in communication with the server 100C1 and does not receive the invitation from the server 100C2, or does not receive the invitation with sufficient strength to warrant acknowledgement, as it is too distant from the server 100C2. It therefore maintains its connection to the first server 100C1 (step 602). However, when the computing device 102 is in the position of the second computing device 102e, it does receive the invitation from the server 100C2 and enters into a 'handshake' process. This handshake process (step 604) comprises the SIP application running on the processor 301 of the computing device 102 sending a signal comprising acknowledgement of the invitation from the second server 100C2 and details of the network applications that it is running. These details include at least some of the following, but in this embodiment includes all of the following: the bandwidth required to accommodate each channel of the network connection, the port number assigned to the channel and the priority level of the channel (i.e. how important it is that that channel should not be terminated). The signal may be construed as a request for bandwidth, which, if available could be pre-allocated to the computing device 102. The server 100C2 of the second cell C2 receives this signal and compares the requirements of each application with the bandwidth available (step 606).

It is conceivable that the first and second servers 100C1,C2 would communicate, may be after being alerted as to the desire to transfer by the hand-shake process initiated by the computing device 102. However, it is perhaps convenient for the hand-shake, or related communication, to include information relating to the bandwidth, port numbers, or the like, so that applications that are started when as the computing device 102 is in the process of transferring to the second server 100C2 are effectively communicated to the second server 100C2.

It may be that the second cell C2 can well accommodate the computing device 102, in which case bandwidth required is pre-allocated (step 608). The second server 100C2 then sends a message to the computing device 102, indicating that, should the computing device 102 enter the area of the second cell C2, a hand-over would be successful (step 610). If the computing device 102 then enters the second cell (step 612), the channels constituting the network connection are transferred to the second cell C2 (step 614). Otherwise, if the computing device 102 does not enter the second cell C2, then computing device 102 remains connected to the first cell C1 (step 616).

It may be that the second cell C2 can only accommodate some of the channels of the network connection, in which case the bandwidth required for each application is considered (step 617). This consideration step starts with those channels deemed to have the highest priority. The second server 100C2 then sends a message to the computing device 102, indicating that, should the computing device 102 enter the area of the second cell C2, a hand-over would be partially successful (step 618). The bandwidth required for each channel is pre-allocated (step 620). If the computing device 102 then enters the second cell C2 (step 622), these channels, identified by their associated port numbers, can be transferred to the second cell C2 (step 624). The remaining, low priority, applications are then terminated (step 626). Otherwise, if the computing device 102 does not enter the second cell C2, then the computing device 102 remains connected to the first cell C1 (step 416)

If the second cell C2 can accommodate none of the network application running on the computing device 102, or can not accommodate all the essential applications, the second server 100C2 then sends a message to the computing device 102, indicating that, should the computing device 102 enter the area of the second cell C2, a hand-over would be unsuccessful (step 628). If the computing device 102 enters the second cell C2 (step 630), the connection with the cellular network would be terminated (step 632). Otherwise, if the computing device 102 does not enter the second cell C2, then the computing device remains connected to the first cell C1.

Although in the above embodiments the channels which should be transferred to the network are automatically detected based upon a priority assigned to that channel, if they cannot all be transferred, other mechanisms could be employed. For example a best fit of channels to the available bandwidth from the network could be performed. Or in yet another alternative embodiment a user of the system could be provided with a list of channels (and/or applications associated with those channels) and asked to elect which channels they wish to keep open. Other mechanisms may be possible.

The invention claimed is:

1. A method of attempting a creation of a wireless IP network connection between a computing device and a wireless network using a processor capable of determining bandwidth wherein the method comprises causing the processor to determine the bandwidth associated with at least a portion of the wireless network connection that it is desired to make to the computing device from the wireless network and further causing the processor to assess whether this bandwidth is available from the wireless network and pre-allocating the bandwidth to the computing device in response to determining that the bandwidth is available before commencing creating the connection.

2. A method according to claim 1 in which the method is used to hand-over a network connection to the network from an existing network.

3. A method according to claim 2 in which the network connection between the computing device and at least one of the network and the existing network comprises at least one channel.

4. A method according to claim 3 in which the method comprises causing the processor to determine the bandwidth required by the at least one of the channels within the network connection.

5. A method according to claim 3 in which the method allows some channels to be maintained with the existing network, whilst other channels are handed over to the network.

6. A method according to claim 3 in which the method allows some channels to be handed over to the network whilst other channels are terminated if they are not handed over to the network.

7. A method according to claim 3 in which the computing device ranks the order of importance of the channels to be handed over to the network.

8. A method according to claim 2 in which the method is arranged to hand-over a connection between an existing network and a network each running the same protocol.

9. A method according to claim 8 in which the network is a cellular network and the method is used to hand-over a connection from an existing network comprising a first cell of a network and a network comprising a second, different, cell of that network.

10. A method according to claim 2 which is arranged to hand-over a connection from an existing network to a network operating on a different protocol.

11. A method according to claim 2 in which the bandwidth of connections that exist within the network are restricted in order to allow the network hand-over to take place.

12. A method according to claim 11 in which the restriction comprises termination.

13. A memory storing instructions, which when loaded on to a computer system cause that computer system to perform the method of claim 1.

14. A processing unit arranged to provide a wireless IP network capable of making at least one data connection to at least one computing device, said processing unit comprising a receiver arranged to receive data specifying the bandwidth requirements for the wireless network connection between the wireless network and a computing device that wishes to join the wireless network, a processor arranged to process data received from the receiver and to determine the bandwidth requirement of a device wishing to join the wireless network, and, if bandwidth is available the processor is further arranged to pre-allocate bandwidth to at least one connection prior to the device joining the wireless network.

15. A processing unit according to claim 14 in which the receiver also provides a receiver of the wireless network.

16. A memory storing instructions, which when loaded on to a processing unit, cause that processing unit to perform as the processing unit of claim 14.

17. A computing device capable of connecting to at least two wireless IP networks simultaneously, said computing device comprising a detector capable of detecting wireless IP networks and arranged to detect the existence of wireless IP networks to which the computing device is capable of connecting, a processor capable of determining bandwidth to generate a determined bandwidth and arranged to determine the bandwidth of at least one connection that it is desired to make between the computing device and a network, and a transmitter capable of transmitting determined bandwidth and arranged to transmit the determined bandwidth determined by the processor to a network detected by the detector to which it is possible to make a connection; said computing device further comprising a transceiver capable of establishing a connection to a first network and arranged to establish a connection with the first network over a first channel should sufficient bandwidth be available; and said transceiver capable of establishing a connection to a second network and arranged to establish a connection with the second network over a second channel simultaneously with the connection with the first network should sufficient bandwidth be available.

18. A computing device according to claim 17 which is capable of connecting to at least two networks operating different protocols.

19. A computing device according to claim 17 which is arranged to transfer at least a portion of an existing connection from an existing network to a network.

20. A computing device according to claim 19 which is arranged to prioritise portions of the existing connection to the existing network that should be maintained over and above other portions of the existing connection.

21. A memory storing instructions, which when loaded on to a computing device cause that computing device to perform as the computing device according to claim 17.

22. A computer network comprising a processing unit capable of providing a network and arranged to provide a wireless network comprising at least one data connection to a computing device, said processing unit comprising a receiver arranged to receive data from the computing device, the network further comprising a processor arranged to determine bandwidth requirements of a wireless network connection and arranged to determine the bandwidth requirement for further wireless network connections that it is desired to make to the wireless network from one of said computing device and another computing device wishing to join the wireless network, the processor being further arranged to process data received from said receiver and to pre-allocate a bandwidth to a connection prior to a computing device joining the wireless network, wherein the processor is arranged to allocate a bandwidth to at least one of the connections.

23. A memory storing instructions, which when loaded on to a network cause that network to perform as the network of claim 22.

24. A method of attempting a creation of a network connection between a device and a wireless network by using a processing arrangement for processing data and being capable of determining the bandwidth of a wireless network connection, wherein the method comprises causing said processing arrangement to determine the bandwidth associated with at least a portion of the wireless network connection that is desired to be made between the device and the wireless network and further causing the processing arrangement to assess whether the bandwidth is available from the wireless network and pre-allocating the bandwidth to the device in response to determining that the bandwidth is available before commencing creation of the connection to the device.

25. A server arranged to provide a wireless network capable of making at least one wireless data connection to at least one computing arrangement, the server comprising a receiver for receiving data specifying the bandwidth requirements of a wireless network connection between the wireless network and a computing arrangement, and a processing arrangement for processing data, the processing arrangement being arranged to process data received from the receiver and to determine the bandwidth available on the wireless network, an allocator for pre-allocating bandwidth to a wireless connection, wherein the processing arrangement is arranged to control the allocator and further arranged to cause the allocator to pre-allocate a bandwidth to the at least one wireless data connection prior to forming the wireless connection if the bandwidth required to form a wireless connection is available.

26. A computer capable of connecting to at least two wireless IP networks simultaneously, said computer comprising a detector for detecting the existence of wireless networks to which the computer is capable of connecting, a bandwidth measurer for determining the bandwidth of one or more connections that it is desired to be made between the computer and a network, and a transmitter for transmitting the bandwidth determined by the bandwidth measurer to a network detected by the network detector, said computer further comprising a transceiver for establishing a connection to a first network over a first channel if sufficient bandwidth is available and for establishing a connection to a second network over a second channel simultaneously with the connection to the first network if sufficient bandwidth is available.

27. A method of attempting a hand-over of a wireless network connection to a wireless network from an existing wireless network, the existing wireless network connection being with a computing device, the method being performed with a processor capable of determining bandwidth, the method comprising causing the processor to determine the bandwidth associated with at least a portion of the wireless network connection that it is desired to make to the computing device from the wireless network and further causing the processor to assess whether this bandwidth is available from the wireless network and pre-allocating the bandwidth to the computing device in response to determining that the bandwidth is available before commencing creating the connection to the wireless network and commencing creation of the wireless connection if bandwidth is available.

28. A method according to claim 27 in which the network and existing network are each running the same protocol.

29. A method of attempting a hand-over of a network connection to a network from an existing network, the existing network connection being with a computing device and including a plurality of channels, the method being performed with a processor capable of determining bandwidth, the method comprising causing the processor to determine the bandwidth associated with each channel of the network connection that it is desired to hand-over from the existing network to the network and further causing the processor to assess whether this bandwidth is available from the network before commencing creating the connection to the network and commencing creation of the connection for channels of the network for which there is bandwidth available and maintaining channels with the existing network for which there is no bandwidth available in the network.

30. A method according to claim 29 in which the computing device ranks the order of importance of the channels to be handed over to the network.

31. A method according to claim 29 in which the network and existing network are each running the same protocol.

32. A method according to claim 29 in which the network and existing network are each running a different protocol.

33. A processing unit arranged to provide a wireless network capable of making at least one wireless data connection including a plurality of channels to at least one computing device, said processing unit comprising a receiver arranged to receive data specifying the bandwidth requirements for the wireless network connection, including the bandwidth requirements for channels within the wireless connection, between the wireless network and a computing device that wishes to join the network, and a processor, the receiver being arranged to forward data that it receives to the processor and the processor being arranged to (a) process data it receives from the receiver, and (b) determine the bandwidth requirement of a device wishing to join the wireless network, the processor being further arranged to pre-allocate bandwidth to at least one channel prior to the device joining the wireless network if the processor determines that bandwidth is available.

34. A method of attempting a creation of a wireless network connection between a computing device and a wireless network wherein the method comprises determining the bandwidth associated with at least a portion of the wireless network connection that it is desired to make to the computing device from the wireless network and assessing whether this bandwidth is available from the wireless network and pre-allocating the bandwidth to the computing device in response to determining that the bandwidth is available before commencing creating the connection.

35. A method of attempting a creation of a wireless network connection between a device and a wireless IP network, wherein the method comprises determining the bandwidth associated with at least a portion of the wireless network connection that is desired to be made between the device and the wireless network and assessing whether the bandwidth is available from the wireless network and pre-allocating the bandwidth to the computing device in response to determining that the bandwidth is available before commencing creation of the connection to the device.

36. A method of attempting a hand-over of a wireless network connection to a wireless network from an existing wireless network, the existing wireless network connection being with a computing device, the method comprising determining the bandwidth associated with at least a portion of the wireless network connection that is desired to make to the computing device from the wireless network and assessing whether this bandwidth is available from the wireless network and pre-allocating the bandwidth to the computing device in response to determining that the bandwidth is available before commencing creating the connection to the wireless network and commencing creation of the connection if bandwidth is available.

37. A method of attempting a hand-over of a network connection to a network from an existing network, the existing network connection being with a computing device and including a plurality of channels, the method comprising determining the bandwidth associated with each channel of the network connection that it is desired to hand-over from the existing network to the network and assessing whether this bandwidth is available from the network before commencing creating the connection to the network, and commencing creation of the connection for channels of the network for which there is bandwidth available based on a ranking of importance of the channels to be handed over to the network.

* * * * *